Patented Jan. 12, 1954

2,666,068

UNITED STATES PATENT OFFICE 2,666,068

HALOGENATION OF STEROIDS

Arthur R. Hanze and Robert H. Levin, Kalamazoo, Mich., assignors to The Upjohn Company, Kalamazoo, Mich., a corporation of Michigan No Drawing. Application October 15, 1951, Serial No. 251,451

15 Claims. (Cl. 260—397.4)

The present invention relates to a novel process for the preparation of certain steroid compounds and is more particularly concerned with a process for the production of 4-halo-21-acyloxy-17α-hydroxypregnane-3,11,20-triones by the halogenation of 21-acyloxy-17α-hydroxypregnane-3,11,20-triones.

It is an object of the present invention to provide a novel process for the halogenation of 21-acyloxy-17α-hydroxypregnane-3,11,20-triones to produce 4-halo-21-acyloxy-17α-hydroxypregnane-3,11,20-triones. Other objects of the invention will be apparent to those skilled in the art to which this invention pertains.

According to the present invention, a 21-acyloxy-17α-hydroxypregnane-3,11,20-trione is reacted with a halogenating agent in tertiary butyl alcohol to produce halogenation at carbon atom four of the steroid nucleus.

Starting compounds for the method of the present invention are 21-acyloxy-17α-hydroxypregnane-3,11,20-triones, especially such compounds wherein the 21-acyloxy group contains from one to eight carbon atoms, such acyloxy groups including, for example, formoxy, acetoxy, propionoxy, butanoyloxy, isobutanoyloxy, valeroyloxy, isovaleroyloxy, hexanoyloxy, heptanoyloxy, octanoyloxy, isooctanoyloxy, and the like, and these acyl groups may carry non-reactive substituents, such as halo, alkoxy, alkyl, and the like, if desired.

The starting 21-acyloxy-17α-hydroxypregnane-3,11,20-triones are prepared by oxidation of 21-acyloxy-3,17-dihydroxypregnane-11,20-diones by conventional procedure, such as chromic acid oxidation. These compounds are in turn prepared by replacement of the 21 bromine atom in 21-bromo-3,17-dihydroxypregnane-11,20 - diones, using a selected organic acid sodium salt, or by acylation of the corresponding 21-hydroxy compound.

The halogenating agents used in the process of the present invention are agents capable of causing halogenation at the four position of the steroid nucleus, such as, for example, bromine, chlorine, N-bromoacetamide, N-chlorosuccinimide, N-bromosuccinimide, 3-bromo-5,5-dimethylhydantoin, 1,3-dibromo-5,5-dimethylhydantoin, hypobromous acid and hypochlorous acid. These reagents have all been found to possess the capacity of effecting halogenation of the four position of the nucleus of the starting material. For the accomplishment of such result and attainment of the highest yields, at least the theoretical amount of halogenating agent should be employed. When the agent contains a single bromine or chlorine atom, the theoretical proportion is two moles of agent to one mole of starting steroid, but when two halogen atoms are present in the halogenation agent, only one mole of agent per mole of steroid is theoretically required. Ordinarily, it is preferred to use an excess of the halogenating reagent over the theoretical amount, e. g., from one to five moles of agent per mole of steroid. Although less than the theoretical proportion may be used if desired, it should be obvious that lower yields and conversions are obtained by such manner.

In carrying out the process of the present invention, one molar part of the starting 21-acyloxy-17α-hydroxypregnane-3,11,20-trione is admixed, using either order of addition, with at least the theoretical amount of halogenating agent in tertiary butyl alcohol at a temperature below about fifty degrees centigrade, preferably between about fifteen and about forty degrees centigrade. Pyridine and other acid-binding solvents should not be employed as solvents, nor should substantial amounts of acid-binding reagents such as potassium acetate or the like be added to, or be present in, the reaction mixture. The length of the reaction time is not critical, depending somewhat upon the starting materials and reaction conditions employed, in this respect varying somewhat inversely with the proportions of reactants and temperature employed, and reaction periods of one to ten days have been found satisfactory, for example, using room temperature. At the end of the reaction period, the desired product may usually be separated from the mixture of reaction products as a crystalline solid, washed with solvent, and dried to give the more highly purified crystalline material. Additional material may be obtained by adding water to the filtrate of the reaction mixture.

The solvent used in the method of the invention is tertiary butyl alcohol. It has been found that in this solvent the products, 4-halo-21-acyloxy-17α-hydroxypregnane-3,11,20-triones, crystallize out in a high state of purity. This result is very important, especially in the case of the 4-bromo compounds, since, in solution in the presence of hydrogen ions, these products readily rearrange or further halogenate to give undesired side products, as is known in the art.

The yield of desired reaction product is usually between about forty and about sixty-five per cent, but by application of optimum reaction conditions the higher yields can be obtained consistently. However, conversions of eighty-five to ninety-five per cent can be obtained since product of low purity can be regenerated to starting material by treatment with zinc in acetic acid.

The presence of water in amount between about traces and about eighteen per cent of the volume of the solvent is advantageous. With no water present the reaction proceeds sluggishly, while with considerable water present the same result is observed. However, with about one to about eighteen per cent of water, preferably about one to above five per cent of water, the reaction both proceeds at a reasonable rate and gives high yields of desired product. The addition of mineral acid to the reaction mixture is advantageously employed to start the reaction.

The following examples illustrate the method of the present invention, but are not to be construed as limiting.

*Example 1.—4-bromo-21-acetoxy-17α-hydroxypregnane-3,11,20-trione*

To 404 milligrams (1.0 millimole) of 21-acetoxy-17α - hydroxypregnane-3,11,20-trione [prepared from 3,17 - dihydroxypregnane-11,20-dione [Sarett, J. Am. Chem. Soc. 70, 1454 (1948)] by bromination in chloroform to give the 21-bromo derivative followed by reaction with potassium acetate in refluxing acetone to give 3,17-dihydroxy - 21 - acetoxypregnane-11,20 - dione, which is then oxidized in the three position with N-bromoacetamide in basic solution] dissolved in 48 milliliters of tertiary butyl alcohol, was added 0.75 milliliter of water containing 0.122 milliliter of forty-eight per cent aqueous hydrogen bromide (one millimole of hydrogen bromide) and 276 milligrams (two millimoles) of N-bromoacetamide. The mixture was allowed to stand for 49 hours at room temperature whereafter the crystals were filtered off. The filtrate was concentrated under nitrogen to one-half its volume and allowed to stand overnight. A second crop of crystals was filtered off, washed with alcohol and dried. The yield was 297 milligrams (61.4 per cent) of 4-bromo-21-acetoxy-17α-hydroxypregnane - 3,11,20 - trione, melting at 200–202 degrees centigrade with decomposition and having an $[\alpha]_D^{23}$ of plus 99 degrees in acetone.

*Example 2.—4-bromo-21-acetoxy-17α-hydroxypregnane-3,11,20-trione*

In the same manner as given in Example 1, 4-bromo - 21 - acetoxy - 17α - hydroxypregnane-3,11,20-trione is prepared from 21-acetoxy-17α-hydroxypregnane-3,11,20-trione using N-bromosuccinimide instead of N-bromoacetamide.

*Example 3.—4-chloro-21-acetoxy-17α-hydroxypregnane-3,11,20-trione*

In the same manner as given in Example 1, 4-chloro - 21 - acetoxy - 17α - hydroxypregnane-3,11,20-trione is prepared from 21-acetoxy-17α-hydroxypregnane - 3,11,20 - trione using N-chlorosuccinimide instead of N-bromoacetamide. The product has a melting point of 244–245 degrees and has an $[\alpha]_D^{24}$ of plus 100 degrees in acetone.

*Example 4.—4-bromo-21-acetoxy-17α-hydroxypregnane-3,11,20-trione*

In the same manner as given in Example 1, 4-bromo - 21 - acetoxy - 17α - hydroxypregnane-3,11,20-trione is prepared from 21-acetoxy-17α-hydroxypregnane-3,11,20-trione using 3-bromo-5,5-dimethylhydantoin instead of N-bromoacetamide.

*Example 5.—4 - bromo-21-propionoxy-17α-hydroxypregnane-3,11,20-trione*

In the same manner as given in Example 1, 4-bromo - 21 - propionoxy-17α-hydroxypregnane-3,11,20-trione is prepared from 21-propionoxy-17α-hydroxypregnane - 3,11,20-trione using N-bromoacetamide.

*Example 6.—4 - chloro-21-octanoyloxy-17α-hydroxypregnane-3,11,20-trione*

In the same manner as given in Eample 1, 4-chloro-21-octanoyloxy-17α - hydroxypregnane-3,11,20-trione is prepared from 21-octanoyloxy-17α-hydroxypregnane - 3,11,20-trione using N-chlorosuccinimide instead of N-bromoacetamide.

*Example 7.—4-bromo-21-acetoxy-17α-hydroxypregnane-3,11,20-trione*

To 404 milligrams (1.0 millimole) of 21-acetoxy-17α - hydroxypregnane-3,11,20-trione, prepared from 21 - acetoxy - 3,17-dihydroxypregnane-11,20-dione by oxidation according to conventional procedure, dissolved in 48 milliliters of tertiary butyl alcohol was added 0.75 milliliter of water containing 0.122 milliliter of 48 percent aqueous hydrobromic acid (one millimole of hydrogen bromide) and 160 milligrams (one millimole) of bromine. The mixture was allowed to stand for 48 hours at room temperature whereafter the crystals were filtered off. The filtrate was concentrated to one-half its volume and allowed to stand overnight. A second crop of crystals was filtered off, washed with alcohol and dried. The yield was 284 milligrams (58.7 percent) of 4-bromo-21-acetoxy-17α-hydroxypregnane-3,11,20-trione melting at 205–207 degrees centigrade with decomposition and having an $[\alpha]_D^{23}$ of plus 100 degrees in acetone.

*Example 8.—4-chloro-21-acetoxy-17α-hydroxypregnane 3,11,20-trione*

In the same manner as given in Example 7, 4-chloro - 21 - acetoxy - 17α - hydroxypregnane-3,11,20-trione is prepared from 21-acetoxy-17α-hydroxypregnane-3,11,20-trione using chlorine instead of bromine.

*Example 9.—4-bromo-21-acetoxy-17α-hydroxypregnane-3,11,20-trione*

In the same manner as given in Example 7, 4-bromo - 21 - acetoxy-17α - hydroxypregnane-3,11,20-trione is prepared from 21-acetoxy-17α-hydroxypregnane-3,11,20-trione using 1,3-dibromo-5,5-dimethylhydantoin instead of bromine.

*Example 10.—4-bromo-21-acetoxy-17α-hydroxypregnane-3,11,20-trione*

To 404 milligrams (1.0 millimole) of 21-acetoxy-17α-hydroxypregnane - 3,11,20-trione, prepared from 21-acetoxy-3,17-dihydroxypregnane-11,20-dione by oxidation according to conventional procedure, dissolved in 25 milliliters of tertiary butyl alcohol was added 3.5 milliliters of aqueous hypobromous acid containing 194 milligrams (two millimoles) of hypobromous acid. After standing at room temperature for three days, the crystals of 4-bromo-21-acetoxy-17α-hydroxypregnane-3,11,20-trione were filtered off, washed with twenty percent aqueous alcohol and dried. The product had a melting point at 202 degrees centigrade with decomposition and an $[\alpha]_D^{25}$ of plus 100 degrees in acetone.

Example 11.—4-chloro-21-butanoyloxy-17α-hydroxypregnane-3,11,20-trione

In the same manner as given in Example 10, 4-chloro-21-butanoyloxy-17α-hydroxypregnane-3,11,20-trione is prepared from 21-butanoyloxy-17α-hydroxypregnane-3,11,20-trione using hypochlorous acid instead of hypobromous acid.

In the same manner as given in Examples 1 through 11, starting with the corresponding 21-acyloxy-17α-hydroxypregnane-3,11,20-triones, the following compounds are prepared: 4-bromo-21-formoxy-17α-hydroxypregnane-3,11,20-trione; 4-chloro-21-formoxy-17α-hydroxypregnane-3,11,20-trione; 4-chloro-21-propionoxy-17α-hydroxypregnane-3,11,20-trione; 4-bromo-21-butanoyloxy-17α-hydroxypregnane-3,11,20-trione; 4-chloro-21-isobutanoyloxy-17α-hydroxypregnane-3,11,20-trione; 4-bromo-21-isobutanoyloxy-17α-hydroxypregnane-3,11,20-trione; 4-chloro-21-valeroyloxy-17α-hydroxypregnane-3,11,20-trione; 4-bromo-21-valeroyloxy-17α-hydroxypregnane-3,11,20-trione; 4-chloro-21-hexanoyloxy-17α-hydroxypregnane-3,11,20-trione; 4-bromo-21-hexanoyloxy-17α-hydroxypregnane-3,11,20-trione; 4-bromo-21-heptanoyloxy-17α-hydroxypregnane-3,11,20-trione; 4-bromo-21-octanoyloxy-17α-hydroxypregnane-3,11,20-trione; 4-chloro-21-isooctanoyloxy-17α-hydroxypregnane-3,11,20-trione.

It is to be understood that the invention is not to be limited to the exact details of operation or exact compounds shown and described, as obvious modification and equivalents will be apparent to one skilled in the art, and the invention is therefore to be limited only by the scope of the appended claims.

We claim:

1. A process for the halogenation of a 21-acyloxy-17α-hydroxypregnane-3,11,20-trione to produce a 4-halo-21-acyloxy-17α-hydroxypregnane-3,11,20-trione by reaction therewith of a halogenating agent which consists in mixing such halogenating agent and a 21-acyloxy-17α-hydroxypregnane-3,11,20-trione in tertiary butyl alcohol containing up to about eighteen per cent water by volume.

2. A process for the halogenation of a 21-acyloxy-17α-hydroxypregnane-3,11,20-trione to produce a 4-halo-21-acyloxy-17α-hydroxypregnane-3,11,20-trione by reaction therewith of a halogenating agent which consists in mixing such halogenating agent and a 21-acyloxy-17α-hydroxypregnane-3,11,20-trione in tertiary butyl alcohol containing up to about eighteen per cent water by volume at a temperature below about fifty degrees centigrade, to cause halogenation at carbon atom four of the steroid nucleus.

3. A process for the halogenation of a 21-acyloxy-17α-hydroxypregnane-3,11,20-trione to produce a 4-halo-21-acyloxy-17α-hydroxypregnane-3,11,20-trione by reaction therewith of a halogenating agent which consists in mixing such halogenating agent and a 21-acyloxy-17α-hydroxypregnane-3,11,20-trione in tertiary butyl alcohol containing up to about eighteen per cent water by volume at a temperature below about fifty degrees centigrade, to cause halogenation at carbon atom four of the steroid nucleus, and separating the 4-halo-21-acyloxy-17α-hydroxypregnane-3,11,20-trione thus produced.

4. A process for the halogenation of a 21-acyloxy-17α-hydroxypregnane-3,11,20-trione to produce a 4-halo-21-acyloxy-17α-hydroxypregnane-3,11,20-trione which comprises: mixing a reagent selected from the group consisting of N-bromoacetamide, N-bromosuccinimide, N-chlorosuccinimide, 3-bromo-5,5-dimethylhydantoin, 1,3-dibromo-5,5-dimethylhydantoin, hypobromous acid, hypochlorous acid, bromine and chlorine, and a 21-acyloxy-17α-hydroxypregnane-3,11,20-trione in tertiary butyl alcohol containing up to about eighteen per cent water by volume, at a temperature below about fifty degrees centigrade, to cause halogenation at carbon atom four of the steroid nucleus.

5. A process which comprises: mixing, in an amount of at least that theoretically required to produce the desired result, a reagent selected from the group consisting of N-bromoacetamide, N-chlorosuccinimide, N-bromosuccinimide, 3-bromo-5,5-dimethylhydantoin, 1,3-dibromo-5,5-dimethylhydantoin, hypobromous acid, hypochlorous acid, bromine and chlorine, and a 21-acyloxy-17α-hydroxypregnane-3,11,20-trione, wherein the acyloxy group contains up to and including eight carbon atoms, in tertiary butyl alcohol containing up to about eighteen per cent water by volume, at a temperature between about fifteen and about forty degrees centigrade, to cause halogenation at carbon atom four of the steroid nucleus, and separating the 4-halo-21-acyloxy-17α-hydroxypregnane-3,11,20-trione thus produced.

6. A process which comprises: mixing an excess of N-bromoacetamide and a 21-acyloxy-17α-hydroxypregnane-3,11,20-trione, wherein the acyloxy group contains up to and including eight carbon atoms, in tertiary butyl alcohol containing up to about eighteen per cent water by volume, at a temperature below about fifty degrees centigrade, to cause bromination at carbon atom four of the steroid nucleus, and separating the 4-bromo-21-acyloxy-17α-hydroxypregnane-3,11,20-trione thus produced.

7. A process which comprises: mixing, in a proportion of at least about two moles to one, N-bromoacetamide and 21-acetoxy-17α-hydroxypregnane-3,11,20-trione in tertiary butyl alcohol containing up to about eighteen per cent water by volume to which a small amount of mineral acid has been added, at a temperature between about fifteen degrees and about forty degrees centigrade, to cause bromination at carbon atom four of the steroid nucleus and separating the 4-bromo-21-acetoxy-17α-hydroxypregnane-3,11,20-trione thus produced.

8. A process which comprises: mixing an excess of N-chlorosuccinimide and a 21-acyloxy-17α-hydroxypregnane-3,11,20-trione, wherein the acyloxy group contains up to and including eight carbon atoms, in tertiary butyl alcohol containing up to about eighteen per cent water by volume, at a temperature below about fifty degrees centigrade, to cause chlorination at carbon atom four of the steroid nucleus, and separating the 4-chloro-21-acyloxy-17α-hydroxypregnane-3,11,20-trione thus produced.

9. A process which comprises: mixing, in a proportion of at least about two moles to one, N-chlorosuccinimide and 21-acetoxy-17α-hydroxypregnane-3,11,20-trione in tertiary butyl alcohol containing up to about eighteen per cent water by volume to which a small amount of mineral acid has been added, at a temperature between about fifteen degrees and about forty degrees centigrade, to cause chlorination at carbon atom four of the steroid nucleus and separating the 4-chloro-21-acetoxy-17α-hydroxypregnane-3,11,20-trione thus produced.

10. A process which comprises: mixing an excess of 1,3-dibromo-5,5-dimethylhydantoin and a 21-acyloxy-17α-hydroxypregnane-3,11,20-trione, wherein the acyloxy group contains up to and including eight carbon atoms, in tertiary butyl alcohol containing up to about eighteen per cent water by volume, at a temperature below about fifty degrees centigrade, to cause bromination at carbon atom four of the steroid nucleus and separating the 4-bromo-21-acyloxy-17α-hydroxypregnane-3,11,20-trione thus produced.

11. A process which comprises: mixing, in a proportion of at least about one mole to one, 1,3-dibromo-5,5-dimethylhydantoin and 21-acetoxy-17α-hydroxypregnane-3,11,20-trione in tertiary butyl alcohol containing up to about eighteen per cent water by volume to which a small amount of mineral acid has been added, at a temperature between about fifteen degrees and about forty degrees centigrade, to cause bromination at carbon atom four of the steroid nucleus and separating the 4-bromo-21-acetoxy-17α-hydroxypregnane-3,11,20-trione thus produced.

12. A process which comprises: mixing an excess of bromine and a 21-acyloxy-17α-hydroxypregnane-3,11,20-trione wherein the acyloxy group contains up to and including eight carbon atoms, in tertiary butyl alcohol containing up to about eighteen per cent water by volume, at a temperature below about fifty degrees centigrade to cause bromination at carbon atom four of the steroid nucleus and separating the 4-bromo-21-acyloxy-17α-hydroxypregnane-3,11,20-trione thus produced.

13. A process which comprises: mixing, in a proportion of at least about one mole to one, bromine and 21-acetoxy-17α-hydroxypregnane-3,11,20-trione in tertiary butyl alcohol containing up to about eighteen per cent water by volume, to which a small amount of mineral acid has been added, at a temperature between about fifteen degrees and about forty degrees centigrade to cause bromination at carbon atom four of the steroid nucleus and separating the 4-bromo-21-acetoxy-17α-hydroxypregnane-3,11,20-trione thus produced.

14. A process which comprises: mixing an excess of hypochlorous acid and a 21-acyloxy-17α-hydroxypregnane-3,11,20-trione in tertiary butyl alcohol containing up to about eighteen per cent water by volume at a temperature below about fifty degrees centigrade, to cause chlorination at carbon atom four of the steroid nucleus and separating the 4-chloro-21-acyloxy-17α-hydroxypregnane-3,11,20-trione thus produced.

15. A process which comprises: mixing, in a proportion of at least about two moles to one, hypochlorous acid and 21-acetoxy-17α-hydroxypregnane-3,11,20-trione in tertiary butyl alcohol containing up to about eighteen per cent water by volume, at a temperature between about fifteen and about forty degrees centigrade, to cause chlorination at carbon atom four of the steroid nucleus and separating the 4-chloro-21-acetoxy-17α-hydroxypregnane-3,11,20-trione thus produced.

ARTHUR R. HANZE.
ROBERT H. LEVIN.

References Cited in the file of this patent
UNITED STATES PATENTS

| Number | Name | Date |
|---|---|---|
| 2,369,065 | Marker | Feb. 6, 1945 |
| 2,541,104 | Sarett | Feb. 13, 1951 |
| 2,584,159 | Rosenkranz | Feb. 5, 1952 |